Aug. 27, 1963    R. B. ROSANDER    3,101,610
HIGH SPEED UNIVERSAL SETTING TESTING MACHINE
Filed March 25, 1959    4 Sheets-Sheet 1

INVENTOR
Russell B. Rosander
BY
Wm. R. Glisson
ATTORNEY

INVENTOR
Russell B. Rosander.
BY Wm R. Glisson
ATTORNEY

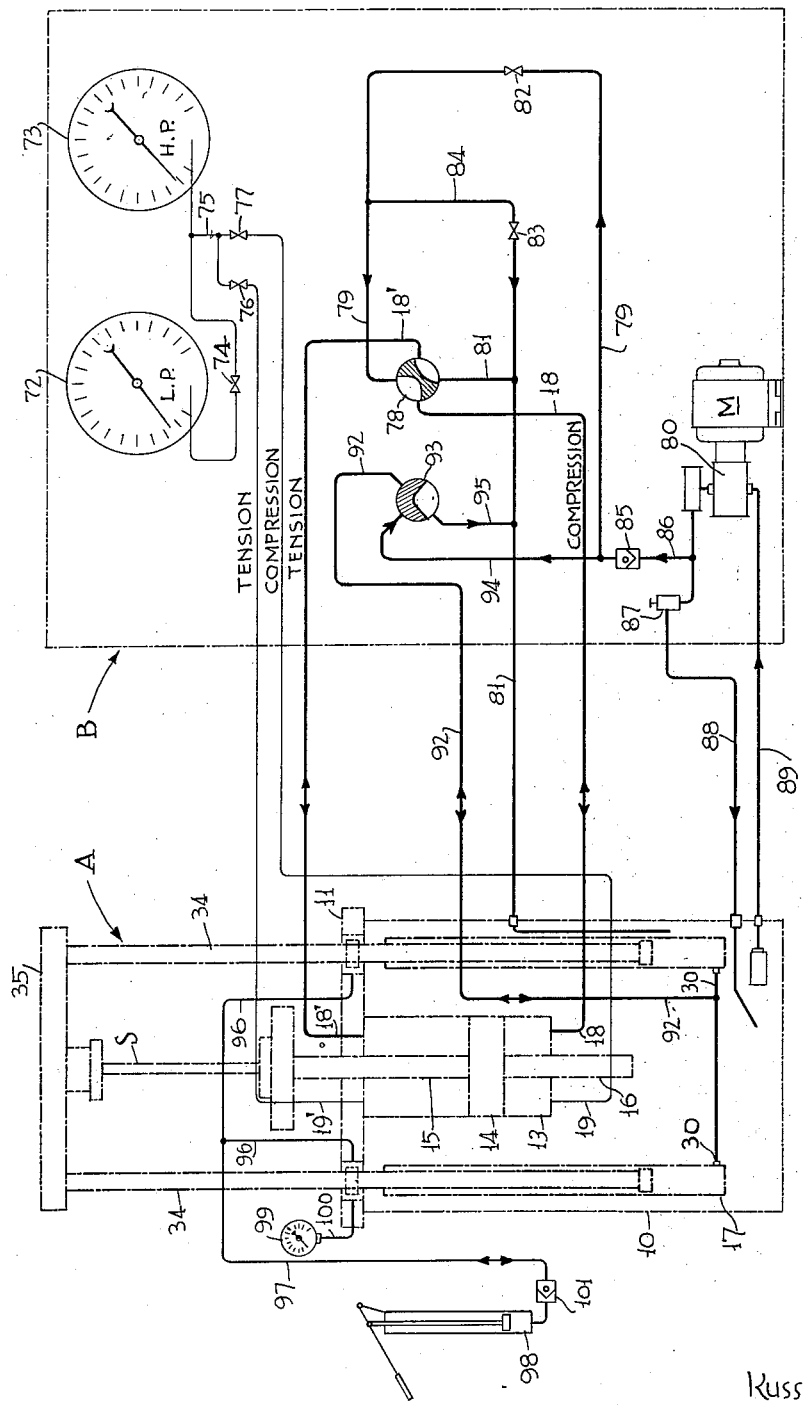

United States Patent Office 3,101,610
Patented Aug. 27, 1963

3,101,610
HIGH SPEED UNIVERSAL SETTING TESTING MACHINE
Russell B. Rosander, Wayne, Pa., assignor, by mesne assignments, to The Budd Company, Philadelphia, Pa., a corporation of Pennsylvania
Filed Mar. 25, 1959, Ser. No. 801,941
7 Claims. (Cl. 73—93)

This invention relates to a high speed universal setting testing machine and has for an object the provision of improvements in this art.

Most testing machines of the fluid power type have a piston operated ram which is powered to move in only one direction. Such machines require three separate crossheads or crosshead-like parts to make tension and compression tests, the tension tests being made in one space and the compression tests being made in the other space formed between said three crossheads.

Many testing machines have a movable crosshead which travels along columns and which can be secured only at a limited number of selectable locations along the columns provided by spaced notches in the columns. The crosshead must be moved up and down by power, sometimes by screws, sometimes by hoists, and sometimes by rigging with the power ram. All of these arrangements are slow and laborious to operate; some provide only a limited number of selectable positions; some have troublesome backlash in one or both directions, as when screw columns are used both to move and hold the crosshead; and most of them require two test spaces.

One of the particular objects of the present invention is to provide a testing machine which provides rapid and universal crosshead settings.

Another object is to provide a double acting power ram so that all testing, both tension and compression, can be done in a single space between crossheads.

Another object is to provide improved means for raising and lowering the adjustable crosshead.

Another object is to provide anchoring means for the adjustable crosshead which will securely hold it in any adjusted position entirely without backlash in either direction.

Another object is to provide improved column locking means.

Another object is to provide specimen grips and power means which will securely hold a specimen for either tension or compression and which can be used for applying tension and compression in alternation.

The above and other objects and advantages of the invention will be apparent from the following description of an exemplary embodiment, reference being made to the accompanying drawings wherein:

FIG. 9 is a piping diagram.

Figure 1:
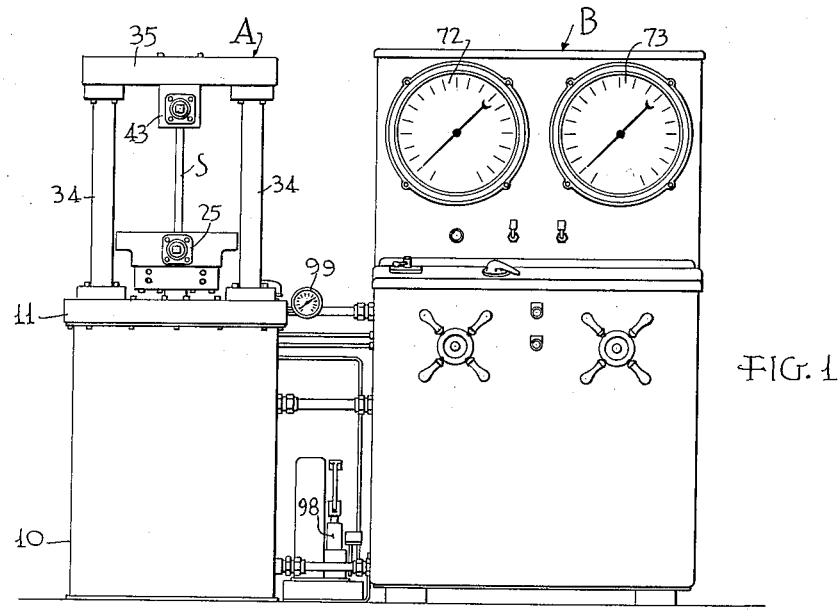
FIG. 1 is a front view of a testing machine embodying the invention.
Figure 2:
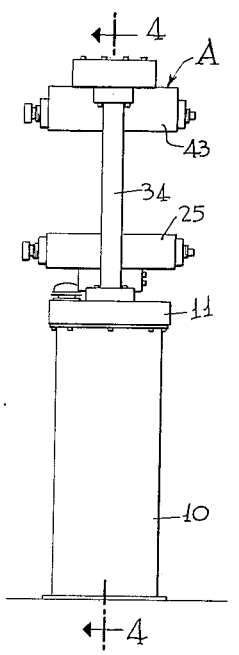
FIG. 2 is a side elevation looking at the left side of FIG. 1.
Figure 3:
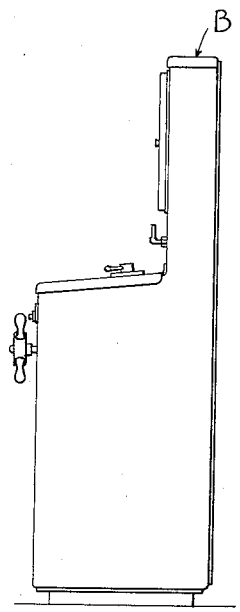
FIG. 3 is a side elevation looking at the right side of FIG. 1.

Referring to the drawings, the apparatus comprises the testing machine proper A, with which the present invention is principally concerned, and a control and instrument console B.

The testing machine proper A comprises a base 10 surmounted at a convenient working height by a thick rigid crosshead table 11. Beneath the center of the table there is secured, as by bolts 12, a power ram cylinder 13, and within the cylinder there operates a piston 14, carrying at its upper end a ram plunger rod 15 and at its lower end a tail rod 16. The effective piston area is equal on each end to provide equal force in each direction. Suitable sealing means are provided for the piston rods; however, for the tail rod 16 this does not have to prevent all leakage since the base 10 is formed as a fluid tight tank to contain the supply of hydraulic fluid for the machine and it does not matter if there is some leakage back into this reservoir tank or sump so long as suitable pressures are obtained in the power cylinder. Some fluid is shown in the tank at 17.

Fluid connections 18 and 19 are shown for the lower end of cylinder 13 and there will be similar fluid connections for the upper end, as will be seen in FIG. 9.

Figure 7:
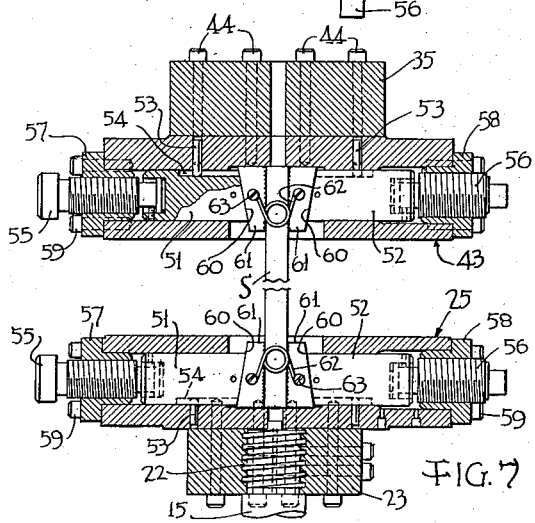
FIG. 7 is a vertical partial section taken on the line 7—7 of FIG. 4.
Figure 8:
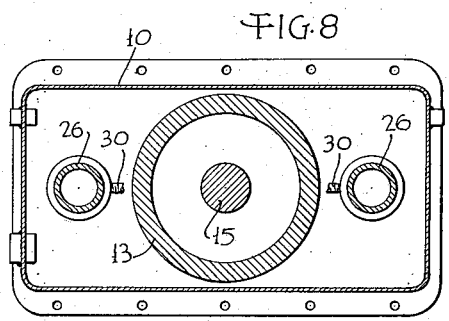
FIG. 8 is a transverse plan section taken on the line 8—8 of FIG. 4.

On the upper end of the ram piston rod 15 there is secured, as by a heavy threaded joint 22, a head base 23 and to the head base 23 there is secured, as by screws 24, a clamp head 25 which is shown in more detail in FIG. 7.

On either side of the crosshead table and therebeneath there is carried a crosshead adjusting cylinder 26 having an upper head 27 secured to the table 11, as by screws 28, and a lower head 29 threaded on its lower end and provided with a pressure fluid connection 30. Suitable sealing means are provided for each head.

Within each cylinder 26 there operates a piston 33 carrying a large rigid column 34 which at the upper end carries a heavy adjustable crosshead 35. The reduced upper end 36 of each of the two columns 34 is socketed in a recess formed in the crosshead 35 and therebelow carries a ring 37 in a groove 38, the ring and column being rigidly clamped to the crosshead 35 by a collar 39 and screws 40.

A clamp head 43 is secured beneath the crosshead 35, as by screws 44. This clamp head 43 is almost identical with the lower one 25 and is shown in more detail in FIG. 7.

Means are provided for locking the columns 34 securely in any adjusted position. The locking means is of the hydraulic type and for each column comprises a close fitting clamp sleeve 45 surrounding the column. The ends of the sleeve are clamped tightly in the cylinder head 27 and in an upper head 46 which is secured to the top of the table 11, as by screws 47. Suitable seals are provided at the heads to prevent leakage. An annular pressure fluid space or chamber 48 is provided in the table 11 around the intermediate portion of each clamp sleeve and pressure fluid connections are provided for these spaces, as shown in FIG. 9. The sleeves fit the columns closely when not squeezed inward by fluid pressure but allow the columns to be moved through them; however, the sleeves, while axially rigid and held against axial movement, are sufficiently resilient or flexible and yieldable in the intermediate portion to be forced inward to securely clamp the columns when sufficient fluid pressure is applied exteriorly to them in the chambers 48.

The clamp heads 43 and 25 are shown in FIG. 7 to include push bars 51 and 52 mounted in retaining guideways in the heads and held against turning by pins 53 fitting in splines 54. Push-pull screws 55 and 56 are turnably secured in the outer ends of the push bars 51 and 52 respectively and these screws are threaded in heads 57 and 58, respectively, which are secured to the clamp heads, as by screws 59.

The push bars 51, 52 are inclined outwardly on their ends, as at 60, to retain clamp jaws 61 and force them axially toward the ends of a test specimen S when the jaws are clamped on the specimen. Springs 62 on the sides of the clamp jaws 61 and secured thereon by screws 63 urge the jaws toward open position.

Figure 4:
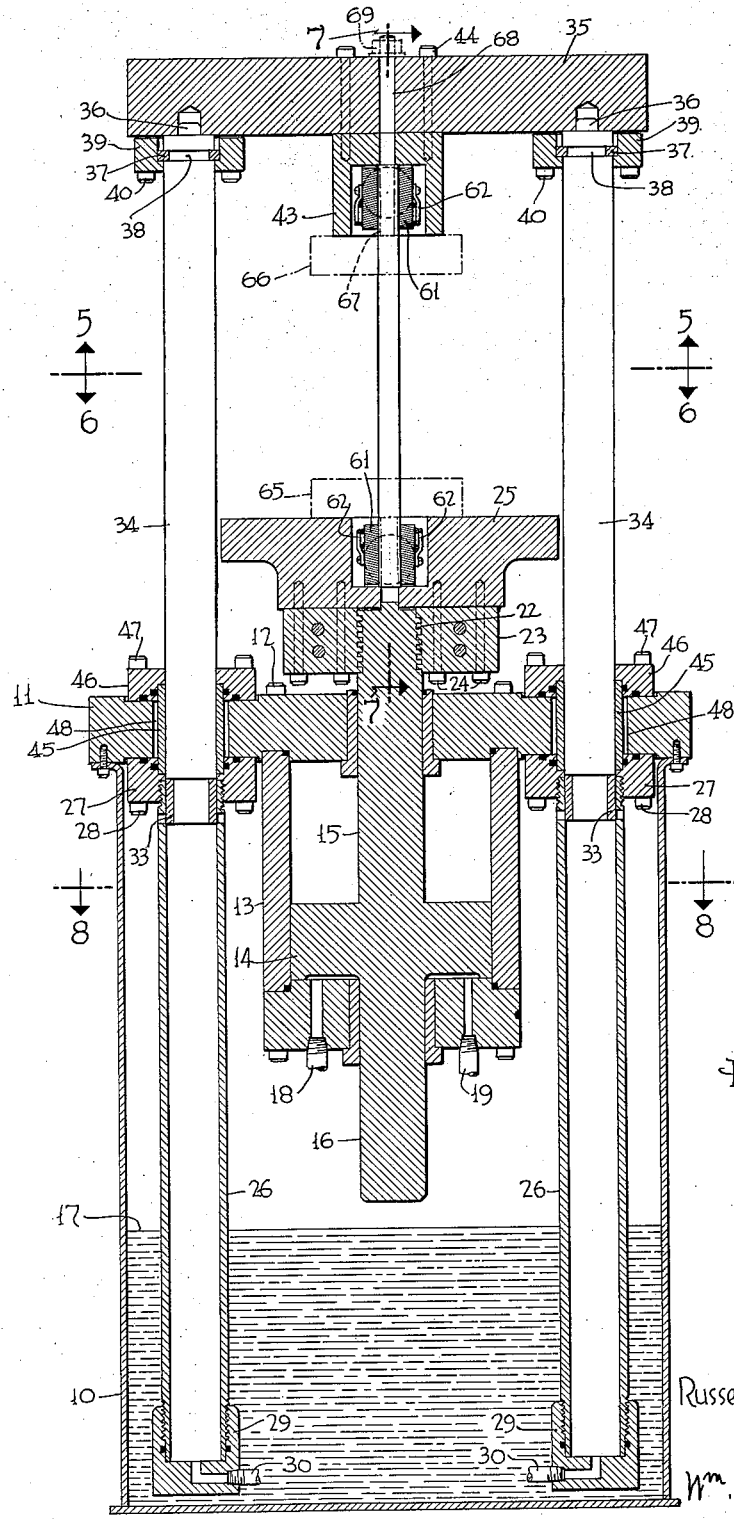
FIG. 4 is an enlarged vertical section of the testing machine proper, the view being taken on the line 4—4 of FIG. 2.
Figure 5:
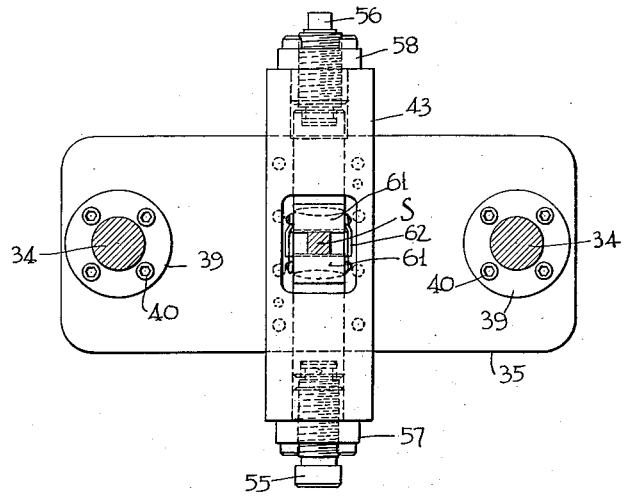
FIG. 5 is a transverse plan section looking upward, the view being taken on the line 5—5 of FIG. 4.
Figure 6:
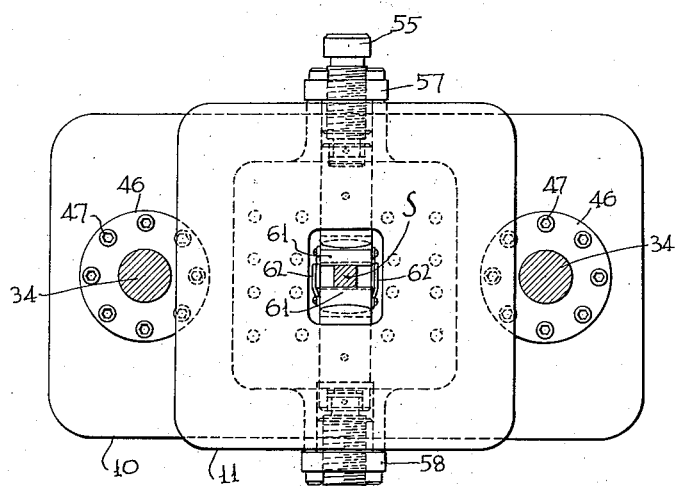
FIG. 6 is a transverse plan section taken on the line 6—6 of FIG. 4.

In some cases it may be desired to crush a specimen between blocks 65, 66, shown in broken lines in FIG. 4, in which case the lower block 65 can be laid on top of the lower clamp head 25 and the upper block 66 can be held by a stem bolt 67 secured thereon and passing up through a hole 68 and a nut 69 on the bolt 67 above the crosshead.

As shown in FIG. 9, fluid connection 18 for the ram cylinder 13 is for pressure fluid and fluid connection 19 is for the pressure indicators or gages 72 and 73 on the console B. Similar lines 18' and 19' are provided in the upper end of the cylinder. The lines 18, 19 are for producing and mesuring compression and the lines 18' and 19' are for producing and measuring tension in a specimen. Gage 72 measures low pressures and can be cut in or out by a valve 74. Gage 73 measures high pressure and may be left on the pressure line 75 at all times. Valves 76 and 77 select for tension or compression respectively.

A valve 78 selects the end of cylinder 13 which will be served with pressure fluid, whether the lower end by 18 for compression or the upper end by 18' for tension. A pressure line 79 leads to the valve 78 from a pump 80 and a return line 81 leads from the valve 78 to the reservoir 17. A loading valve 82 is provided in the pressure line 79 and an unloading valve 83 is provided in a valve by-pass line 84 around the valve 78.

A check valve 85 is provided in the main line 86 from the pump 80 and an overload valve 87 is provided in a return line 88 from the pump to the reservoir. A supply line 89 furnishes fluid from the reservoir to the pump. A motor M drives the pump.

The fluid lines 30 of the crosshead lift cylinders 26 are connected into a common supply and exhaust line 92 leading to a control valve 93. A pressure line 94 supplies fluid from the pump line 86 to the valve 93 and a return line 95 leads from the valve 93 to the reservoir. The valve 93 may be turned to connect the line 92 with either the pressure fluid line 94 or with the exhaust line 95 or to lock it off from both, the position shown, to hold the pistons and crosshead up until the columns can be locked or unlocked.

Pressure fluid lines 96 lead to the column lock chambers 48 from a common line 97 from a pump 98. This may be hand (or foot) operated. A pressure gage 99 and pressure gage line 100 indicate the column clamping pressure being applied. A check valve 101 in the line 97 will hold the locking pressure as long as desired but may be actuated to release the clamping pressure when desired.

In operation, the valve 101 is opened to release pressure from the column locks and the column lift devices 26, 33 are controlled by the valve 93 and associated means to place the columns 34 and crosshead in the desired position for the length of specimens to be tested, after which the column locks again have pressure applied to hold the columns and crosshead in the adjusted position.

Thereafter the valve 78 is operated to apply tension or compression and to apply and release fluid from the cylinder 13 as may be required. The specimen will be clamped first, of course.

It will thus be seen that the invention provides improved testing apparatus which fulfills the stated objects and which operated in an efficient and convenient manner.

While one embodiment of the invention has been described for purposes of illustration, it is to be understood that there may be various embodiments and modifications within the scope of the invention.

What is claimed is:

1. A high speed universal testing machine comprising in combination, a base, a table on the base, a power cylinder secured beneath said table, a push-pull power piston in said power cylinder, a power ram extending from said power piston through said table, means on the end of said ram for engaging a specimen, adjusting cylinders secured beneath said table, adjusting pistons in said adjusting cylinders, crosshead columns extending from said adjusting pistons through said table, an adjustable crosshead secured on said columns, means carried beneath said crosshead for engaging a specimen, means for locking said columns in any adjusted position to said table, means for supplying pressure fluid to or exhausting fluid from said adjusting cylinders, and means for supplying pressure fluid to or exhausting fluid from either end of the power cylinder to operate the power piston and ram, said means for locking said columns to the table comprising axially rigid flexible sleeves closely surrounding said columns, means securing the ends of the sleeves against axial movement on the table, the table having annular sealed fluid chambers surrounding the mid-portions of the length of the sleeves, and means for supplying pressure fluid to or exhausting fluid from said chambers to clamp the sleeves to the columns or to release the sleeves from the columns.

2. In a high speed testing machine comprising in combination, a base, a crosshead table rigidly secured on the base, column locking means comprising axially rigid laterally flexible imperforate sleeves secured to said table against endwise axial movement relative thereto, means attached to said crosshead table forming sealed pressure fluid chambers between said crosshead table and the midportion of the length of said sleeves, rigid smooth columns slidably guided in said sleeves, and means for supplying pressure fluid to or exhausting fluid from said chambers to lock the sleeves to the columns or to release the columns from the sleeves.

3. A high speed testing machine comprising in combination, axially movable smooth rigid columns adapted to be gripped along the length thereof for supporting an upper crosshead, a base, column gripping means carried by said base comprising thin wall axially rigid laterally flexible imperforate sleeves connected at their ends to said base completely surrounding and guiding said colums, means forming sealed pressure fluid chambers between the mid-portion of the length of said sleeves and said base, and means for supplying pressure fluid to said chambers to lock said sleeves to said columns and rigidly connect said columns supporting said crosshead to said base.

4. A high speed testing machine comprising in combination, a base, a crosshead table rigidly secured on the base, an upper crosshead for said machine, a plurality of smooth slidable columns rigidly connected to said upper crosshead and being connectable to said crosshead table, means for locking said columns to said table comprising axially rigid laterally flexible imperforate sleeves closely surrounding and guiding said columns, means securing the ends of the sleeves to the table against axial movement relative thereto, means forming sealed pressure fluid chambers between the mid-portions of the length of said sleeves and said crosshead table, and means for supplying pressure fluid to said chambers to lock said sleeves to said columns and connect said columns and said upper crosshead rigidly to said crosshead table.

5. In a high speed universal testing machine, a base, a crosshead table connected to said base, a working piston power device mounted on said table having a piston ram for movement in an axial direction, a first clamp head connected to said ram, a second clamp head, movable smooth column means rigidly connected to said second clamp head, positioning piston means connected to said column means for rapidly moving said column means and said second clamp head relative to said first clamp head, means for locking said column means to said table comprising axially rigid laterally flexible imperforate sleeves closely surrounding said columns, means securing the ends of the sleeves to the table against axial movement relative thereto, means forming sealed pressure fluid chambers surrounding the midportions of the length of said sleeves, and means for supplying pressure fluid to said chambers to lock the sleeves to the columns and fix the relative positions of said clamp heads.

6. A testing device comprising in combination, a crosshead, columns movable axially relative to said crosshead and adapted to be locked at any point along their length to said crosshead, a continuous imperforate axially rigid laterally flexible sleeve extending completely around each column and fixed at its ends to said crosshead against axial movement relative thereto for guiding on said columns, means on said crosshead forming annular fluid chambers of lesser axial extent than said sleeves surrounding said columns and the middle of said sleeves, and fluid pressure means connected to said fluid chambers for circumferentially compressing the middle of said sleeves and locking said columns to said crosshead.

7. In a high speed testing machine, a base crosshead member, an upper croshead movable relative to said base crosshead member, guide columns for supporting said upper crosshead, means mounted on one of said crossheads for locking said crossheads against relative movement, said means comprising axially rigid laterally flexible imperforate sleeves closely surrounding and guided on said columns, means forming sealed pressure fluid chambers surrounding the mid-portions of the length of said sleeves, and means for supplying pressure fluid to said chambers to clamp said sleeves to said columns and to form a rigid column frame between said crosshead and said base.

References Cited in the file of this patent

UNITED STATES PATENTS

| | | |
|---|---|---|
| 860,009 | Becker | July 16, 1907 |
| 2,920,895 | Krouse | Jan. 12, 1960 |
| 2,999,382 | McClelland | Sept. 12, 1961 |

FOREIGN PATENTS

| | | |
|---|---|---|
| 566,379 | Great Britain | Dec. 28, 1944 |
| 1,087,601 | France | Aug. 25, 1954 |